United States Patent [19]
Ribnitz

[11] Patent Number: 4,647,298
[45] Date of Patent: Mar. 3, 1987

[54] ELECTROSTATIC POWDER RECOVERY INSTALLATION

[76] Inventor: Peter Ribnitz, Haselstrasse 15, 9013 St. Gallen, Switzerland

[21] Appl. No.: 648,744

[22] Filed: Sep. 10, 1984

[30] Foreign Application Priority Data

Sep. 8, 1983 [CH] Switzerland .................. 4904/83
Nov. 29, 1983 [CH] Switzerland .................. 6366/83

[51] Int. Cl.$^4$ ........................................... B01D 50/00
[52] U.S. Cl. ................................ 55/334; 55/341 R; 55/337; 98/115.2
[58] Field of Search .............. 98/115.2; 55/319, 332, 55/341 R, 334, 337, 459 R

[56] References Cited

U.S. PATENT DOCUMENTS

| | | | |
|---|---|---|---|
| 3,732,669 | 5/1973 | Chambers | 55/334 X |
| 4,099,937 | 7/1978 | Ufken et al. | 55/319 X |
| 4,183,150 | 1/1980 | Nash | 55/334 X |
| 4,245,551 | 1/1981 | Berkmann | 55/341 R X |
| 4,443,235 | 4/1984 | Brenholt et al. | 55/319 X |
| 4,531,453 | 7/1985 | Warman et al. | 55/332 X |

Primary Examiner—Charles Hart
Attorney, Agent, or Firm—Antonelli, Terry & Wands

[57] ABSTRACT

An electrostatic powder coating installation which includes a cabinet accommodating a device for producing electrostatically charged powder, with a filter strip being disposed in the cabinet at a bottom end thereof. A first suction fan, covering a large portion of the bottom area of the cabinet is provided for producing a suction field in the cabinet with an underpressure by virtue of the provision of the filter strip. A cleaning apparatus or nozzle, associated with the filter strip, removes surplus powder lying on the filter strip. A device is provided for drawing the filter strip along at least one length of the cabinet when pigments in the powder change thereby assigning a specific zone of the filter strip to each pigment. A powder recovery installation includes a basic frame or housing which accommodates a powder container, a filter, a sifting machine, and a basket for the sifting material. The basket for the sifting material is adapted to be easily replaceable. A contaminant or dirt catching container is arranged so as to be at the same pressure level as the inner space of the powder container, with the container having a porous bottom. A suction conveyor with the nozzle enables the direct further processing of the powder and it is possible to provide a powder recovery installation which saves space and which is relatively inexpensive.

6 Claims, 5 Drawing Figures

ELECTROSTATIC POWDER RECOVERY INSTALLATION

The present invention relates to a coating installation and method of operating the same, and, more particularly, to an electrostatic powder coating installation which includes a cabinet or housing accommodating a means for discharging electrostatically charged powder, a filter strip, located at a floor or base of an inner space of the cabinet and being capable of being moved or displaced through the cabinet, a first suction fan, having a large surface area, installed in an area of the bottom of the cabinet for generating a suction field with a vacuum in the cabinet through the filter strip, cleaning means associated with the filter strip for removing surplus powder lying on the filter strip, and a powder recovery means for the electrostatic powder coating installation which includes a sifting machine, a basket for sifting material, a dirt or contaminate catching container, a filtering device, a fan, and a floor or base member which is at least partially fluidizing and a powder drawing element.

In, for example, Auslegeschrift No. 2,546,920 and U.S. Pat. No. 4,245,551, installation of the aforementioned type, arranged in the cabinet or housing, are proposed; however, one of the biggest problems or disadvantages of the proposed installation resides in the fact that the components such as the suction means, filtering means, and recovery means of the proposed installation are complex and too much time is lost when the pigment is changed.

More particularly, in the installation described in U.S. Pat. No. 4,245,551, it is necessary to replace the entire filter unit when the pigment changes. However, the filters are relatively expensive and, the system is relatively large therefore a considerable amount of space is required for each pigment. In this connection, replacing a filter unit, normally in the form of pocket filters or cartridge filters is difficult and, with this proposed system, one structural unit is always required for each pigment.

In the aforementioned Auslegeschrift, it is necessary to replace the filter strips for each pigment and generally at least two people are required to change the strips. Furthermore, the filter strips have to be stored separately and, in many cases, the situation arises that two or more suction units must be provided to minimize the time consumed in changing the pigment.

Swiss Application No. 4,904/83-2 also provides an example of an electrostatic powder coating apparatus; however, as with the above noted United States Patent and the Auslegeschrift, the apparatus and associated process are relative complicated and require substantial investment to manufacture the apparatus all of which constitute obstacles to a wide spread use of an electrostatic powder coating apparatus. Moreover, in the proposed apparatus the suction removal, sifting and returning of the powder is very elaborate and very expensive.

The same complex problems arise in a direct removal of the powder by suction in a coating procedure for special uses such as, for example, in coating the seams of cans. In the systems which have been proposed, the powder, removed by suction, is precipitated from the air in a filter and falls on a floor or base of the filter housing and, from there, the powder is conveyed to a sifting machine either by an intermediate conveying device through a mini-cyclone separator and a bucket wheel sluiceway or squeeze valve. From there the cleaned powder is directly forwarded to the powder container.

The aim underlying the present invention essentially resides in providing a multipigment electrostatic coating installation and method of operating the same which avoids, by simple means, shortcomings and disadvantages encountered in the prior art.

In accordance with advantageous features of the present invention, an electrostatic powder coating installation is provided which includes a means for pulling or drawing a filter strip for at least one length of the cabinet or housing of the installation when the pigment changes thereby assigning a filter strip zone to every pigment.

In accordance with still further features of the present invention, to achieve a significant structural simplification, elements generally employed in the prior art installations especially elements which tend to break down are eliminated. More particularly, bucket wheel sluiceways which tend to get jammed when loaded with powder or squeezing valves which have a high rate of wear and tear on the rubber and cause the powder to cake so as to prevent satisfactory operation need not be provided nor is it necessary to provide an intermediate conveying apparatus which requires additional compressed air and associated components which are also susceptible to wear and tear.

In accordance with the present invention, the recovery apparatus of the electrostatic powder coating installation includes a direct powder feed pipe leading to a sifting machine. Moreover, the basket for the sifting material and the filtering apparatus are disposed in the same enclosed space and, by virtue of such location, a means are provided for transporting powder away to carry the powder which is sifted out by the sifting machine and the powder which falls on the filtering apparatus so that the powder can be used again with the entire structural unit being replaceable as a module.

Advantageously, in accordance with the present invention, a suction nozzle is provided which includes a propulsion device adapted to move the suction nozzle along the filter strip. The suction system of the present invention is adapted to operate intermittently and a fibrous web, preferably one that can be rolled and unrolled is disposed beneath the filter strip.

Preferably, in accordance with still further features of the present invention, an entrance feed pipe into the sifting machine is arranged tangentially and an air suction device is located at one end of the sifting machine to generate a potential sump in the machine.

The longitudinal axis of the sifting machine may, in accordance with the present invention, be inclined in a direction of the container for catching dirt or contaminants and the apparatus may be arranged in such a manner that a cleaning by filtering can take place right in the filtering space of the shifting machine individually or in blocks thereby making a continuous operation possible.

At least a floor or base member of the filtering space of the sifting machine is made of a porous material and, preferably, the floor or base is inclined.

Advantageously, the individual units of the powder coating installation and, for example, the powder container are replaceable and, preferably, without the use of any specialized tools.

In accordance with the method of electrostatic powder coating of the invention, during a spraying, the filter strip is moved only when the pigment changes to get a portion of the filter strip associated with the new pigment ready inside the cabinet or housing. Moreover, the suction nozzle of the electrostatic powder coating installation is preferably operated intermittently.

The contaminate or dirt catching container of the electrostatic powder coating installation of the present invention is advantageously maintained at the same pressure level as an area containing the filter and sifting machine and is sealed off.

Accordingly, it is an object of the present invention to provide an electrostatic powder coating installation, powder recovery installation for the electrostatic powder coating installation, and a method for operating the electrostatic powder coating installation which is simple in construction and therefore relatively inexpensive to manufacture.

A further object of the present invention resides in providing an electrostatic powder coating installation, powder recovery installation for the electrostatic powder coating installation and a method for operating the installation which is relatively small and which dispenses with the needs for various conventional elements while nevertheless achieving the same separation characteristics and degree of effectiveness.

A still further object of the present invention resides in providing an electrostatic powder coating installation and a powder recovery installation for the electrostatic powder coating installation which functions realiably under all operating conditions.

These and other objects, features, and advantages of the present invention will become more apparent from the following description when taken in connection with the accompanying drawings which show, for the purposes of illustration only, several embodiments in accordance with the present invention.

Figure 1:
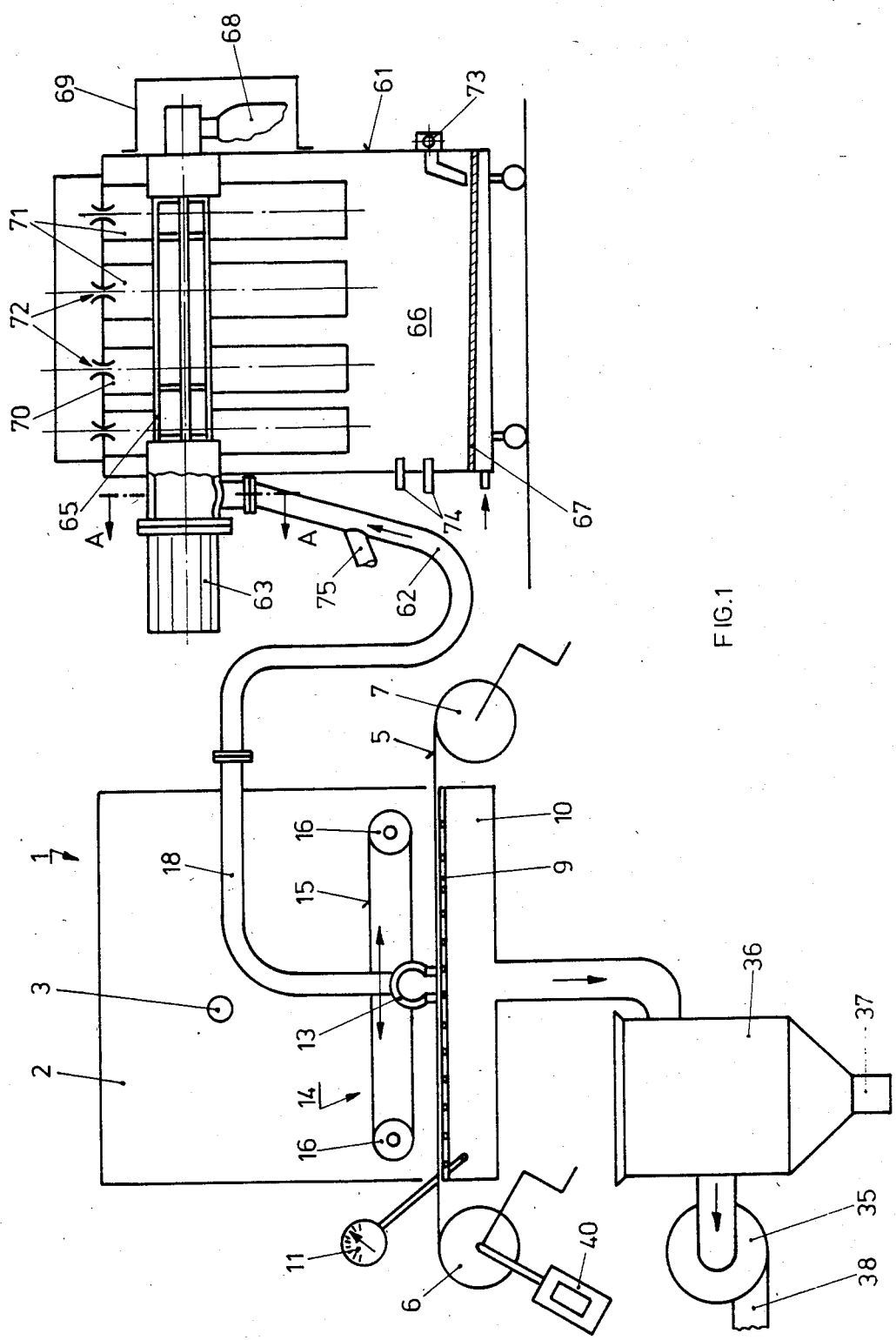
FIG. 1 is a schematic view of an electrostatic powder coating installation and recovery apparatus constructed in accordance with the present invention with lateral walls thereof being removed.

DETAILED DESCRIPTION:

Referring now to the drawings wherein like reference numerals are used through the various views to designate like parts and, more particularly, to FIG. 1, according to this figure an electrostatic powder coating installation generally designated by the reference numeral 1 includes a cabinet or housing 2 accommodating a gun 3 for spraying pigment particles onto an object to be coated in a conventional manner. A filter strip 5, disposed at a lower end of the cabinet 2 is stretched over two rollers 6, 7, with each of the rollers being provided with an appropriate drive mechanism (not shown). A support grating 9 is disposed above the floor or bottom of the cabinet 2 and beneath the filter strip 5, with a portion of the cabinet 2 located under the support grating 9 forming a trough 10. A pressure differential meter 11 is provided for measuring a vacuum prevailing in the trough 10 during operation, with the vacuum serving as a determining or control parameter for controlling the powder coating installation.

A suction nozzle 13, fastened to a nozzle actuator generally designated by the reference numeral 14, is disposed above the filter strip 5 and in close contact therewith, with the actuator 14 including an endless strip or chain 15 disposed over two driven guide pulleys 16 so as to permit the suction nozzle 13 to be selectively reciprocated back and forth over the filter strip 5 in the cabinet 2 and permit the suction nozzle 13 to be stopped at a specific location during a coating operation. The suction nozzle 13 is connected with a recovery installation by a hose 18 which flexes or bends in accordance with a location of the suction nozzle 13 during an operation of the coating installation 1.

Figure 5:
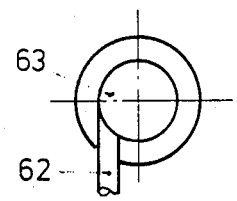
FIG. 5 is a cross-sectional view taken along the line A—A in FIG. 1.

As also shown in FIG. 1, the recovery installation includes a base frame 61 in which the other elements are installed, with a mixture of powder and air being delivered to a sifting machine 63 through a feed pipe 62. Advantageously, the axis of the sifting machine 63 is inclined by approximately 5° or 10° and has a tangential air intake (FIG. 5) since a potential sump comes into being as a result of that and, with the help of an exhaust fan 64, and a centrifuging a uniform deposit of the powder in the basket 65 for the sifting material results. By virtue of this arrangement, a screw conveyor which is usually used in sifting machines is eliminated and thus another element which can now malfunction or breakdown is eliminated and, by virtue of the elimination of the screw conveyor, the total price of the installation can be substantially reduced. Since the sifting machine 63 is installed directly in the powder container 66, the cleaned powder falls directly on a fluidizing floor or base member 67 and is immediately reused. On a side opposite the powder intake in the sifting machine 63, a dirt or contaminant catching container or sack 68 is installed which is adapted to catch dirt particles or the like in the powder which are not sifted out in the basket 65 for the sifting material. In order to provide for the same conditions of pressure for the sifting machine 63, the dirt or contaminate catching container 68 is sealed off from the environment by a thick housing 69 which is adapted to be quickly removable. A rapid cleaning and replacement of the basket 65 for the sifting material is made possible by removing the housing 69. The basket 65 for the sifting material is locked in position with, for example, snap closures and rubber buffer members thereby making the maintenance considerably easier. In addition to the sifting machine 63, a filter battery 70 is installed in an upper part of the housing so as to create a space with the same pressure in which the sifting machine 63 and the filter are installed. The number of filter cartridges 71 of the battery 70 depends on the amount of air to be processed and, as can readily be appreciated, the filter cartridges 71 can be disposed horizontally. Customarily, the manner in which the various elements are installed is such that the amount of space in the housing is maintained as small as possible and, for example, pocket filters may be employed instead of the filter cartridges 71.

Figure 4:
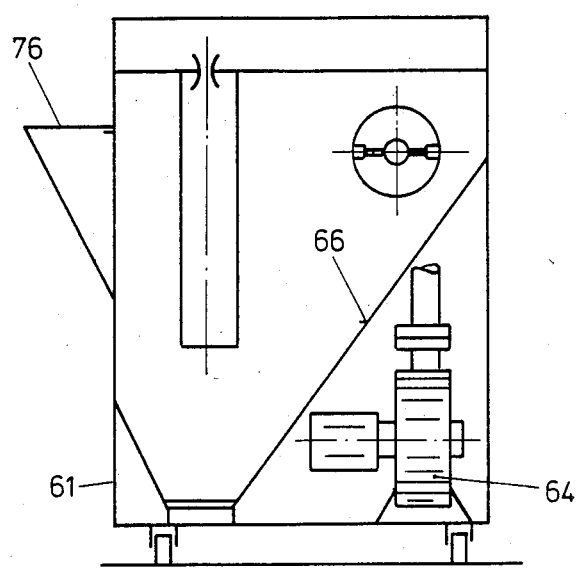
FIG. 4 is a side view of the powder recovery installation of FIG. 1.

The filter battery 70 separates the powder from the powder-air mixture contained in the space and emerging from the basket 65 for the sifting material and swirled by the fluidizing period. Nozzles 72 are provided for blowing compressed air cyclically or pressure-dependently into one or more of the filter cartridges 71 in a direction opposite to a normal direction of air flow so that a cleaning of the filter cartridges 71 takes place in a conventional manner. The powder floor onto the flow or base member 67 and is immediately available for further use. The floor or base member 67 is made of a porous material so that a fluidizing of the powder can be accomplished. The floor or base member 67 is, advantageously, slightly inclined at, for example, 5°–10° so that one or more suction nozzles 73 may be attached at one side and the powder can be removed from the floor or base member 67. A maximum height of the accummulation of powder can be monitored and controlled by a powder level probe 74. A delivery of fresh powder can be accomplished directly in the return pipe 62 through a connecting adapter 75. The advantage of this procedure lies in the fact that the fresh powder is also already sifted. It is also possible in accordance with the present invention to manually put the powder in the installation through a filling cap 76 (FIG. 4).

Figure 2:
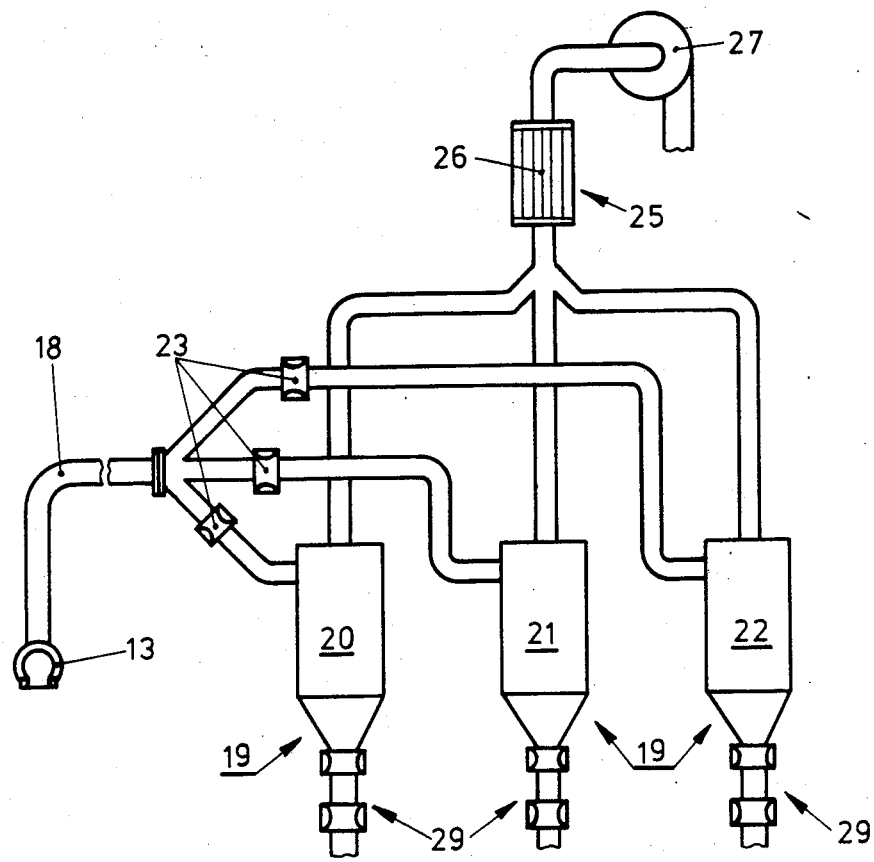
FIG. 2 is a schematic view of another embodiment of an electrostatic powder coating installation constructed in accordance with the present invention provided with individual pigment separators.

As shown most clearly in FIG. 2, appropriate squeezing valves 23 may be provided for connecting desired different pigments, deposited in cyclone separators 20, 21, 22, with the suction nozzle 13, so that the proper conveying routes are open in dependence upon the amount of material to be processed to convey the portions of the pigment which have fallen onto the filter strip 5 during a spraying into the proper cyclone separator 20, 21 or 22.

A fine filter 25 with filter cartridges 26 is installed after the cyclone separators 20, 21, 22, with an exhaust fan 27 being provided for exhausting air which has been substantially completely cleaned in the fine filter 25 into the atmosphere.

A powder sluiceway generally designated by the reference numeral 29 is disposed beneath each cyclone separator in the dust separating battery 19, which sluiceway 29 is, in the illustrated embodiment, fashioned of two squeezing valves. A sifting machine (not shown) with a storage bin may be disposed beneath the sluiceway 29 for accommodating separated fragments of pigments which can once again be reused. A suction intake fan 35, having a large surface area, is installed on the bottom of the trough 10 with a fine filter installation 36 and a dust collector 37 being disposed upstream of the suction intake fan 35. The cleaned air escapes through an exhaust pipe 38. A meter 40 is provided so as to enable a determination of the positioning of the filter strip 5.

When the electrostatic powder coating installation 1 is in operation, a certain section of the filter strip 5 is associated with each pigment of the coating and a cyclone separator 20, 21, or 22 is also associated with the respective pigments. When the pigment is changed, the filter strip 5 is moved for a distance at least a length of the cabinet 2 so that either an uncolored part of the filter strip 5 is in the cabinet 2 of a part of the filter strip which has been sprayed with the next pigment is located in the cabinet 2. Depending on the particular pigment used, one of the cyclone separators 20, 21, 22 in the dust separating battery 19 will be used and the corresponding squeezing valve 23 will be opened and the former valve for the previously used pigment will be closed. The squeezing valve 29, filter 30 and container 31 are also associated with the respective cyclone separators 20, 21, 22 in accordance with the specific pigments allocated to them and the same is the case with the filter cartridges of the fine filter 25. Thus, it is only necessary to clean the hose 18 and the suction nozzle 13 when the pigment is changed. As far as the other elements of the installation are concerned, a changing of the valves takes care of the making of the appropriate changes when the pigments are changed.

In order to reduce the energy consumption, a removal by suction by the suction nozzle 13 need not be continuously carried out but the suction can take place discontinuously or intermittently. In this way, it is also possible to clean the fine filter 25 automatically or manually during operation and to maintain a good level of separation with correspondingly low pressure losses in the filter cartridge 26.

By moving or displacing the filter strip 5 in a forward direction, zone by zone, as the pigments change, maximum use can be made of the filter strip 5 while the construction thereof becomes particularly simple since it is not necessary to provide a lower return run or strand of the filter strip 5.

When the pressure differential meter or gauge 11 indicates an underpressure of approximately 100–120 mm WC opposite the upper part of the chamber, this indicates that the filter strip 5 or the corresponding section of the filter strip 5 is saturated with particles of pigment and therefore the section of the filter strip 5 must be cleaned. One significant advantage of an installation employing a filter strip 5 such as proposed by the present invention resides in the fact that since the cloth on the sides of the two rollers 6, 7 is rolled up, it is extremely easy, when the pigment changes, to find the area of the corresponding shade of pigment either manually or automatically through the meter 40. In this manner, the suction system is considerably simplified and it is no longer necessary to provide a continuous cleaning system since no loss of powder occurs when the filter 25 is cleaned, although no powder is removed by suction for a short period of time of, for example, approximately seven seconds.

In another advantage of the coating installation 1 of the present invention resides in the fact that the cleaning of the filter strip 5 can be controlled through the differential pressure meter 11. When this is carried out, it is important for an approximately constant pressure to prevail in the cabinet 2 so that the amount of air removed by suction by the fan 35 can be approximately constant and, as a result thereof, the coating procedure can be carried out in the best possible manner. The life of the filter strip 5 is also considerably extended in this manner as compared with filter strips which circulate constantly as has been the case with previously proposed coating installations. Moreover, a changing of the return system in accordance with the pigment which is to be used can take place automatically since the squeezing valves, for example, by compressed air, are capable of being activated depending upon the position of the filter strip 5. Relatively speaking, the various pigment cyclone separators 20, 21, 22 are relatively small and, for example, may have a height of about 1 mm and a diameter of 25 cm; therefore, if necessary, it is relatively inexpensive to replace the cyclone separators at a relatively low cost. The fine separation of the cloth filters in the fine filter 25 protects the exhaust fan 27 from getting out of balance as a result of an accumulation of pigment dust since any accummulated quantities of the pigment dust are too small to have a harmful or adverse effect on the exhaust fan 27.

Figure 3:
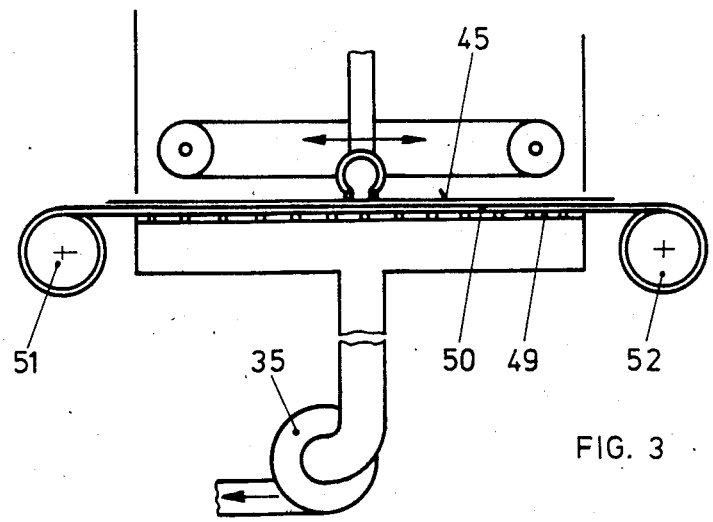
FIG. 3 is an enlarged detail view of a lower portion of a cabinet or housing for an electrostatic powder coating installation constructed in accordance with he present invention.

By virtue of the fact that the slub or twisted portion of the filter strip 5 is always carried along from the filter strip by the relatively strong suction from the suction nozzle 13, it is extremely difficult to separate this portion from the particles of pigment thereby creating another problem with coating insulations of the type contemplated by the present invention; however, the construction of FIG. 3 takes into consideration this problem More particularly, in FIG. 3, a ribbon-like surface filter 45 is stretched out in the cabinet 2, with the filter 45 being constructed so as to advantageously not produce any slub and also advantageously being capable of being thoroughly cleaned with the nozzle 13 even when the pigments are changed. A support grating 49 is disposed under the filter 45 and a strip of fibrous web 50 is provided between the filter 45 and the support grating 49 which can be pushed over two rollers 51, 52 and selectively rolled and unrolled. The filter 45 is constructed so as to be more pentrable by air than the filter strip 5 and two rollers 51, 52 are provided for selectively moving the fibrous web 50. The underpressures detected by the pressure differential meter 11 determine, for example, whether to operate the installation or to change the strip of the fibrous web 50. Consequently, spraying with several pigments may be carried out in the cabinet 2 without removing the filter 45. At the same time, the relatively inexpensive fibrous web 50 serves for the purpose of protecting the fan 35 and thus it is possible to eliminate the use of the filter 36.

Normally, during operation, an underpressure of vacuum of between 300 and 600 WC prevails at a mouth of the suction nozzle 13, with a quantity of air from 300 to 500 m$^3$/Std. exiting through the exhaust fan 27. Naturally, powder is also drawn into the fibrous web 50 from the coarser filter 45 but the powder remains in the strip of the fibrous web 50 so that losses of the pigment also remain within predetermined limits while the lint or other contaminants which otherwise gets into the spray gun are also separated from the powder.

By virtue of the above described arrangement of the coating installation 1, it is possible to avoid the disadvantages of electrostatic powder coating installations of the prior art. Moreover, the above described recovery installation makes it possible to replace the same as a complete structural unit or to connect the same to an existent structural unit such as an electrostatic powder coating installation. Moreover, the present invention contemplates the replacement of the major elements of the electrostatic powder coating and installation which are generally subject to normal wear and tear with fastening means which are easy to remove without, for example, the use of any special tools. Among these units are the powder container 66 together with the filter cartridge 71.

While I have shown and described only one embodiment in accordance with the present invention, it is understood that the same is not limited thereto but is susceptible to numerous changes and modification as known to one having ordinary skill in the art and I therefore do not wish to be limited to the details shown and described herein, but intend to cover all such modifications as are encompassed by the scope of the appended claims.

I claim:

1. A powder recovery means for recovering an electrostatic powder from an electrostatic powder coating installation, the powder recovery means including a powder sifting means adapted to receive powder from the electrostatic powder coating installation, a basket means in communication with the powder sifting means in such a manner that the powder sifting means centrifuges a uniform deposit of the powder in the basket means so as to result in a sifting of the powder by the basket means, a container means mounted at the end of the basket means in communication therewith for receiving contaminants from the basket means, filter means cooperable with the basket means for separating powder from a powder-air mixture emerging from the basket means, a base means which is at least partially porous disposed beneath filter means for receiving powder falling from the filter means, suction means for removing the powder from the powder recovery means, pipe means for directly supplying the powder to the sifting means, a single housing means for accommodating the basket means, the base means, and the filter means, and a means communicating with said housing means for transporting the powder sifted by the sifting means and the powder falling from the filter means so as to enable a reuse of the powder, and wherein the single housing means is constructed as a replaceable structural module.

2. A powder recovery means according to claim 1, wherein an inlet of the pipe means into the sifting means is arranged tangentially thereto, and wherein an air suction means is disposed at one end of the sifting means so as to generate a potential sump in the sifting means.

3. A powder recovery means according to claim 1, wherein a longitudinal axis of the sifting means is inclined in a direction of the container means for catching the contaminants.

4. A powder recovery means according to claim 1, further comprising means for enabling a filtering of the powder in a filter space of the sifting means individually or in blocks so as to enable a continuous opeation of the powder recover means even with the change of pigment in the powder.

5. A powder recovery means according to claim 1, wherein the base means of the sifting means is inclined.

6. A powder recovery means according to claim 1, wherein at least a container means for accommodating the powder is constructed as replaceable module adapted to be replaced without the use of tools.

* * * * *